Aug. 25, 1964    T. F. GREEN    3,145,464
METHOD OF POSITIONING A DAMPING INSERT INTO A TUBULAR SHAFT
Filed March 8, 1962

United States Patent Office 3,145,464
Patented Aug. 25, 1964

3,145,464
METHOD OF POSITIONING A DAMPING INSERT INTO A TUBULAR SHAFT
Thomas Francis Green, Hurst Green, Blackheath, England, assignor to Birfield Engineering Limited, London, England
Filed Mar. 8, 1962, Ser. No. 178,438
2 Claims. (Cl. 29—464)

This invention relates to producing tubular shafts in general and is particularly directed to producing a tubular shaft having an insert fitted therein to lessen the noise transmitted by the tubular shaft and to a method of preparing and inserting such an insert.

For some time it has been a practice to provide a tubular shaft, such as a propeller shaft of a motor vehicle, with one or more fitting inserts provided in the shaft to reduce resonance and noise transmission along the shaft. Prior art structures disclose inserts in the form of a plain cardboard tube which is either an interference fit within the shaft or has a longitudinal split enabling it to be radially compressed upon being fitted into the shaft. However, such structures present the problems of having to be manufactured to a fine tolerance to provide the proper interference fit when made of a plain cardboard tube, or when made in the split form, there is always the attendant danger of the split tube subsequently becoming dislodged or collapsing from the fitted position.

It is, therefore, an object of this invention to provide a method of positioning a tubular insert in a tubular shaft wherein the insert can be made with relatively large tolerances and yet easily be inserted into the shaft so as to provide a satisfactory interference fit therewith.

It is another object of this invention to provide a tubular insert which can be more conveniently manufactured and fitted in a simple and reliable manner.

It is yet another object of this invention to provide an insert having a relative uniform diameter which upon being positioned within a shaft is deformed so as to be in a secure interference fit therewith, and A still further object of this invention is to provide a method of fitting a tubular insert within a tubular shaft which method includes adapting the insert to securely engage the inner surface of the shaft while being easily inserted therein.

Figure 1:
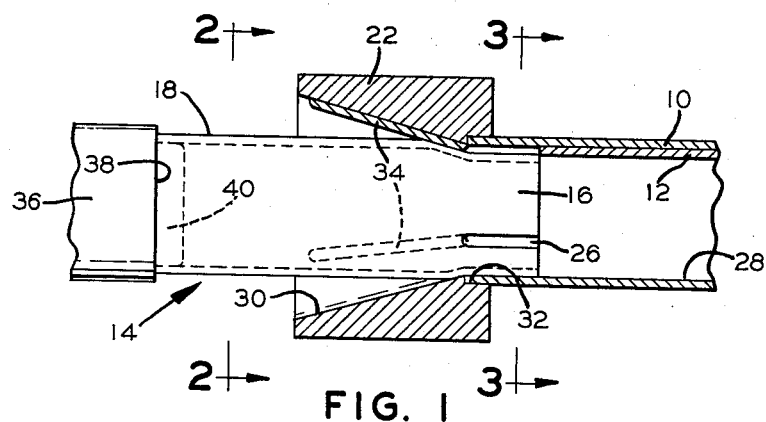
Figure 2:
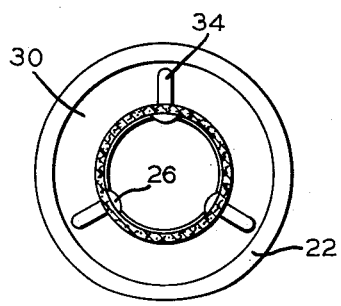
Figure 3:
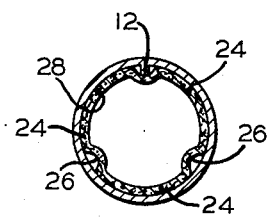

Further and other objects of this invention will become apparent upon a consideration of the specification with reference to the accompanying drawings wherein:

FIG. 1 is a longitudinal view partially in section demonstrating the method of inserting the insert, shown in full, into the shaft, FIG. 2 is a sectional view taken along the lines 2—2 of FIG. 1, and FIG. 3 is a sectional view taken along the lines 3—3 in FIG. 1.

One preferred method of practicing applicant's invention and the structure which results therefrom resides in obtaining a tubular insert of the desired dampening characteristics made from a material such as cardboard or the like which is originally formed so as to have an external diameter greater in size than the internal diameter of the shaft. The wall of the insert is formed with a longitudinal groove substantially aligned with the longitudinal axis of the shaft and extending between the two ends of the insert to enable the latter to be radially compressed during fitting within the shaft. When the shaft is of the welded metallic type and has the usual internal weld flash, the longitudinal groove is conveniently in register with the flash to accommodate the same. A plurality of such longitudinal grooves are preferably formed spaced around the periphery of the insert so that the latter is of crimped appearance, with the arcuate section of the outer surface between the grooves engaging the shafts inner surface in an interfering relationship. If desired, a plurality of similar inserts may be suitably spaced along the length of the shaft instead of providing a single full length insert.

The insert may be formed with the longitudinally extending grooves, or "crimped," during fitting, and according to another feature of the invention a method of fitting a tubular insert within a tubular shaft includes the steps of forcing a plain cylindrical tube into position within the shaft through a die which acts to form a longitudinal groove in the insert before it enters the shaft. Preferably the die is tapered with an inner surface of generally frusto-conical form, this surface having one or more spaced crimping or groove forming means in the form of projections which deform the wall of the insert inwardly to form the groove or grooves before it enters the shaft within which the insert is in an interference fit.

Referring now to the drawings and more particularly to FIG. 1, a tubular shaft shown at 10 is of conventional form and is shown with an axially extending inner weld flash 12; however, providing an insert for a seamless shaft is also within the scope of this invention. A tubular insert shown generally at 14 made from a material having suitable dampening characteristics such as cardboard and the like is provided having an original external diameter greater in size than the internal diameter of the shaft 10. The tubular insert being positioned within the shaft 10 for the purpose of lessening noise transmission by the same.

The insert 14, as shown in FIG. 1, has a portion 16 which has been deformed or crimped so as to securely fit within the tube 10. More particularly, the original portion of the insert 14 shown generally at 18 has been crimped as shown at 16 by having its outer cylindrical surface deformed inwardly by die 22 in a plurality of locations so as to define a plurality of arcuate surfaces 24 interrupted by a plurality of grooves 26 in the surface. The arcuate surfaces 24 intermediate the grooves 26 engage an inner surface 28 of the shaft 10 to provide the interference fit. When using a shaft having a weld flash as shown at 12, the weld flash 12 is accommodated in one of the grooves 26.

The formation of the grooves 26 or "crimping" of the insert 14 may be accomplished during the fitting of the latter into the shaft 10. The original portion 18 of the insert 14 is inserted through the die 22 fitted on one end of the shaft 10. The die 22 is formed with an axially extending opening 30 therein which, as shown in FIG. 1, is of frusto-conical configuration. The end of the die receiving the shaft 10 is provided with a step 32 which receives the shaft and locates the die on the same with the shaft 10 abutting the inner end of the step 32. The conical opening 30 at its junction with the step 32 is formed so as to have a diameter at least as small as the inside diameter of the shaft 10.

Fixed secured to the surface of the conical opening 30 are a plurality of crimping or groove forming means 34. One method of providing the crimping means on the surface of the conical opening 30 is by welding a wire or rod to the surface. As shown in FIG. 2, three crimping means 34 have been secured to the conical surface and are axially disposed relative thereto.

Before it being inserted into the shaft 10, each insert 14 is in the form of the original portion 18, and this original form is inserted into the die 22 with the outer end of the insert 14 engaged by a ram 36. The ram 36 is provided with an annular shoulder 38 and a pilot portion 40; the shoulder 38 being adapted to abuttingly engage the end of the insert 14 and the pilot 40 being adapted to extend within the insert 14 and pilot the same. The ram 36 forces the insert 14 through the die 22 into the desired position within the shaft 10. When the ram 36 engages the die 22 and can no longer force the insert 22, an additional insert is positioned between the ram and the original insert and used to complete the forming operation.

During the passage of the insert 14 through the die 22 it is deformed or crimped by the crimping means 34 into the shape shown at 16. More particularly, the original portion 18 is deformed to have a plurality of longitudinally extending grooves 26 which allow radial compression of the insert 14 during the fitting operation while still providing a satisfactory interference fit between the deformed portion 16 of the insert 14 and the shaft 10. The grooves 26 in the deformed portion 16 impart a resilient effect thereto so that upon insertion and compression into the shaft 10, the compressive forces on the insert 14 maintains the same in engagement with the inner surface 28 of the shaft 10.

While only a single embodiment of this invention has been shown and described, it is apparent that there may be many changes in structure and operation without departing from the scope of this invention as defined by the appended claims.

What is claimed is:

1. The method of positioning a damping insert in a tubular shaft comprising the steps of obtaining a tubular shaft and a tubular insert therefor with the insert having damping characteristics and a greater original outer diameter than the inner diameter of the shaft, obtaining a die having a frusto-conical opening therein with the small end of the opening at least as small as the inner diameter of the shaft and the opening having groove forming means therein, placing the die in abutting relationship with an end of the tubular shaft with the small end of the opening adjacent the opening in the tubular shaft and in alignment therewith, and forcing the tubular insert into the tubular shaft through the frusto-conical opening in the die forming a longitudinal groove therein and reducing the diameter thereof to that of the internal diameter of the shaft with the ungrooved portion of the tubular insert in engagement with the inner diameter of the shaft.

2. The method of positioning an elongated damping insert into an elongated tubular shaft having a longitudinal weld flash on the inner surface thereof comprising the steps of (a) obtaining a tubular shaft having a longitudinal weld flash on the inner surface thereof, (b) obtaining a tubular insert for the tubular shaft having damping characteristics and a greater original outer diameter than the inner diameter of the tubular shaft, (c) obtaining a die having a frusto-conical opening the rein with the small end of the opening at least as small as the inner diameter of the shaft and the opening having groove forming means therein, (d) placing the die in abutting relationship with an end of the tubular shaft with the small end of the opening adjacent the opening in the tubular shaft and in alignment therewith and with the groove forming means in alignment with the weld flash, and (e) forcing the tubular insert into the tubular shaft through the frustro-conical opening in the die thereby forming a longitudinal groove in the insert and reducing the diameter thereof to that of the internal diameter of the shaft and with the longitudinal groove in alignment with and receiving the weld flash and the ungrooved portions of the tubular insert in pressing engagement with the inner diameter of the tubular shaft.

References Cited in the file of this patent

UNITED STATES PATENTS

| | | |
|---|---|---|
| 489,950 | Harrington | Jan. 17, 1893 |
| 568,635 | Stoll | Sept. 29, 1896 |
| 985,905 | Johnston | Mar. 7, 1911 |
| 993,978 | Friel | May 30, 1911 |
| 1,304,036 | Eshelby | May 20, 1919 |
| 1,691,134 | Schlaich | Nov. 13, 1928 |
| 1,924,734 | Brown | Aug. 29, 1933 |
| 1,927,105 | Welch | Sept. 19, 1933 |
| 2,001,167 | Swennes | May 14, 1935 |
| 2,639,496 | Hartzell | May 26, 1953 |
| 2,751,765 | Rowland et al. | June 26, 1956 |
| 2,855,666 | Gleitz | Oct. 14, 1958 |
| 2,952,999 | Glover | Sept. 20, 1960 |
| 3,012,421 | Cull | Dec. 12, 1961 |